United States Patent
Wang et al.

(10) Patent No.: US 10,736,031 B2
(45) Date of Patent: Aug. 4, 2020

(54) ACCESS POINT ENERGY SAVING METHOD AND ACCESS POINT

(71) Applicant: Huawei Technologies Co., Ltd., Shenzhen (CN)

(72) Inventors: Chen Wang, Suzhou (CN); Lin Zhang, Suzhou (CN); Biao Ji, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/670,716

(22) Filed: Aug. 7, 2017

(65) Prior Publication Data

US 2018/0041955 A1 Feb. 8, 2018

(30) Foreign Application Priority Data

Aug. 5, 2016 (CN) .......................... 2016 1 0640202

(51) Int. Cl.
*H04W 52/02* (2009.01)
*H04W 88/08* (2009.01)
*H04W 48/16* (2009.01)
*H04W 84/12* (2009.01)

(52) U.S. Cl.
CPC ....... *H04W 52/0206* (2013.01); *H04W 48/16* (2013.01); *H04W 84/12* (2013.01); *H04W 88/08* (2013.01); *Y02D 70/00* (2018.01); *Y02D 70/10* (2018.01); *Y02D 70/14* (2018.01); *Y02D 70/142* (2018.01); *Y02D 70/26* (2018.01)

(58) Field of Classification Search
CPC . H04W 52/0206; H04W 48/16; H04W 84/12; H04W 88/08
See application file for complete search history.

(56) References Cited

U.S. PATENT DOCUMENTS

| 2008/0151849 | A1 | 6/2008 | Utsunomiya et al. | |
|---|---|---|---|---|
| 2013/0114488 | A1* | 5/2013 | Fang | H04W 52/0206 370/311 |
| 2013/0294303 | A1* | 11/2013 | Vyas | H04W 52/0206 370/311 |

(Continued)

FOREIGN PATENT DOCUMENTS

| CN | 101212380 A | 7/2008 |
|---|---|---|
| CN | 101868009 A | 10/2010 |
| CN | 104955102 A | 9/2015 |
| CN | 105210448 A | 12/2015 |
| KR | 20160001414 A | 1/2016 |
| WO | 2017160551 A1 | 9/2017 |

OTHER PUBLICATIONS

Machine Translation and Abstract of Korean Publication No. KR20160001414, dated Jan. 6, 2016, 15 pages.

(Continued)

*Primary Examiner* — Brian P Cox
(74) *Attorney, Agent, or Firm* — Conley Rose, P.C.

(57) ABSTRACT

An access point (AP) energy saving method and an AP relate to the field of communications technologies, and effectively implement energy saving for the AP. The method includes determining that an AP is not associated with any terminal and there is not any to-be-associated terminal within a preset time segment, and turning off, by the AP, an extended radio frequency circuit, where an operating frequency band of the extended radio frequency circuit is a wireless local area network (WLAN) frequency band other than a 2.4 gigahertz (GHz) frequency band.

17 Claims, 2 Drawing Sheets

(56) References Cited

U.S. PATENT DOCUMENTS

| | | | | |
|---|---|---|---|---|
| 2015/0271829 A1* | 9/2015 | Amini | .................. | H04W 24/02 |
| | | | | 370/329 |
| 2015/0282032 A1* | 10/2015 | Gupta | .................. | H04W 36/22 |
| | | | | 370/237 |
| 2015/0312835 A1* | 10/2015 | Subramanian | .... | H04W 52/0206 |
| | | | | 455/445 |
| 2016/0050683 A1* | 2/2016 | Gupta | .................. | H04W 24/02 |
| | | | | 370/329 |
| 2016/0183162 A1* | 6/2016 | Jeong | .................. | H04W 40/22 |
| | | | | 370/311 |
| 2017/0251440 A1* | 8/2017 | Gilson | .................... | H04W 4/80 |
| 2017/0273017 A1* | 9/2017 | Gidvani | ................ | H04W 24/10 |
| 2017/0366987 A1 | 12/2017 | Amini et al. | | |
| 2018/0213464 A1 | 7/2018 | Jeong et al. | | |

OTHER PUBLICATIONS

Foreign Communication From A Counterpart Application, European Application No. 17184942.5, Extended European Search Report dated Dec. 20, 2017, 8 pages.

Machine Translation and Abstract of Chinese Publication No. CN101212380, dated Jul. 2, 2008, 23 pages.

Machine Translation and Abstract of Chinese Publication No. CN101868009, dated Oct. 20, 2010, 11 pages.

Foreign Communication From A Counterpart Application, Chinese Application No. 201610640202.1, Chinese Office Action dated Aug. 5, 2019, 7 pages.

* cited by examiner

ACCESS POINT ENERGY SAVING METHOD AND ACCESS POINT

CROSS-REFERENCE TO RELATED APPLICATION

This application claims priority to Chinese Patent Application No. 201610640202.1 filed on Aug. 5, 2016, which is hereby incorporated by reference in its entirety.

TECHNICAL FIELD

This application relates to the field of communications technologies, and in particular, to an access point (AP) energy saving method and an AP.

BACKGROUND

In a wireless local area network (WLAN), an AP may be connected to a terminal in a wireless manner.

Generally, there is a large quantity of APs in the WLAN, and a large amount of electric energy is consumed.

SUMMARY

This application provides an AP energy saving method and an AP in order to effectively implement energy saving for an AP.

According to a first aspect, an AP energy saving method is provided, where the method is executed by an AP, the AP may include at least two radio frequency circuits, the at least two radio frequency circuits may include a listening radio frequency circuit and an extended radio frequency circuit, an operating frequency band of the listening radio frequency circuit may be a 2.4 gigahertz (GHz) frequency band, an operating frequency band of the extended radio frequency circuit may be a WLAN frequency band other than the 2.4 GHz frequency band, and the method may include turning off the extended radio frequency circuit when determining that the AP is not associated with any terminal and there is no to-be-associated terminal within a preset time segment.

In this way, if an AP including multiple radio frequency circuits does not serve any terminal, a 2.4 GHz frequency band in the AP may be turned on, and a WLAN frequency band other than the 2.4 GHz frequency band may be turned off. When a basic WLAN service is provided, entire power consumption of the AP is decreased by reducing a quantity of operating radio frequency circuits in the AP, thereby saving energy for the AP without affecting the WLAN service.

With reference to the first aspect, in a possible implementation manner of the first aspect, when the AP discovers a new to-be-associated terminal after turning off the extended radio frequency circuit, the extended radio frequency circuit that is already turned off in the AP is turned on.

Optionally, the AP may discover the to-be-associated terminal using the listening radio frequency circuit.

With reference to the first aspect or the foregoing possible implementation manner, in another possible implementation manner of the first aspect, in order to further improve an energy saving effect of the AP, the AP may further increase a beacon interval from first duration to second duration after turning off the extended radio frequency circuit in the AP, and change the beacon interval to the first duration when turning on the extended radio frequency circuit.

In an actual application, generally, the AP periodically sends a beacon packet to a terminal according to the beacon interval. Therefore, after the extended radio frequency circuit is turned off, if the beacon interval is increased from the first duration to the second duration, the AP sends the beacon packet according to the second duration, which can prolong a beacon packet sending period of the AP. Once the beacon packet sending period of the AP is prolonged, beacon packet sending frequency within a period of time can be decreased, that is, a quantity of beacon packet sending times of the AP is reduced, power consumption resulted from beacon packet sending by the AP is decreased, and the energy saving effect of the AP is further enhanced.

According to a second aspect, an AP is provided, including a processor and at least two radio frequency circuits, where the at least two radio frequency circuits may include a listening radio frequency circuit and an extended radio frequency circuit, an operating frequency band of the listening radio frequency circuit may be a 2.4 GHz frequency band, and an operating frequency band of the extended radio frequency circuit may be a WLAN frequency band other than the 2.4 GHz frequency band, and the processor is configured to turn off the extended radio frequency circuit in the AP when determining that the AP is not associated with any terminal and there is no to-be-associated terminal within a preset time segment.

For a specific implementation manner of the second aspect, reference may be made to a behavior function of the AP in the AP energy saving method provided in the first aspect or the possible implementation manners of the first aspect. Therefore, the AP provided in the second aspect may achieve a same beneficial effect as that in the first aspect.

According to a third aspect, a non-volatile computer readable storage medium storing one or more programs is provided, where the one or more programs include an instruction, and when the instruction is executed by the AP in the first aspect, the second aspect, or any one of the foregoing possible implementation manners, the AP is enabled to execute the event of turning off an extended radio frequency circuit in the AP when determining that the AP is not associated with any terminal and there is no to-be-associated terminal within a preset time segment.

For a specific implementation manner of the third aspect, reference may be made to a behavior function of the AP in the AP energy saving method provided in the first aspect or the possible implementation manners of the first aspect. Therefore, the AP provided in the third aspect may achieve a same beneficial effect as that in the first aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

A principle of the present disclosure includes that when an AP does not provide a service for any terminal, only a common 2.4 GHz frequency band in the AP is turned on and a WLAN frequency band other than the 2.4 GHz frequency band is turned off. When the AP provides a basic WLAN service, a quantity of operating radio frequency circuits in the AP is reduced and entire power consumption of the AP is decreased, thereby saving energy for the AP without affecting the WLAN service.

Figure 1:
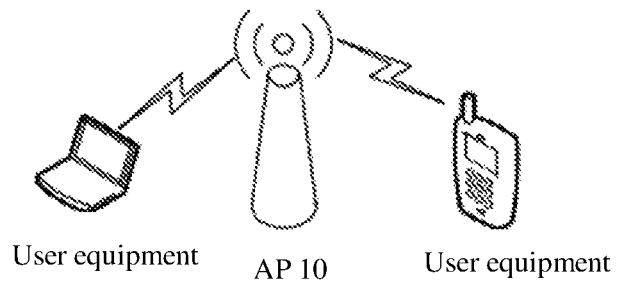
FIG. 1 is a network architecture diagram of a WLAN.

The AP described in the present disclosure may be deployed in the WLAN shown in FIG. 1, or may be deployed in another communications network. It may be understood that the solutions provided in the present disclosure can be used in all scenarios in which an AP is deployed. For ease of description, in the embodiments of the present disclosure, only an example in which an AP 10 is deployed in the WLAN shown in FIG. 1 is used to describe an AP energy saving method and an AP 10 that are provided in the present disclosure. The AP 10 provides service to user equipments, such as mobile terminal, laptop computers, and like and not limited in the present disclosure.

Figure 2:
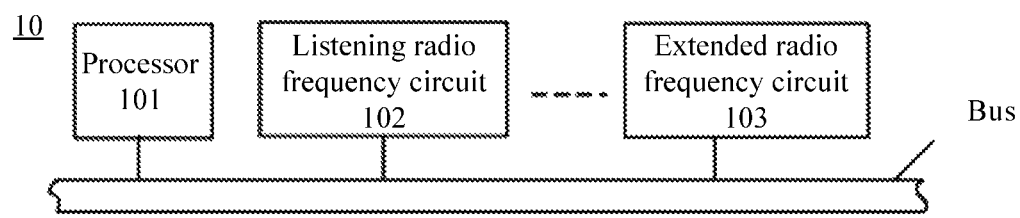
FIG. 2 is a schematic structural diagram of an AP according to an embodiment of the present disclosure.

The following describes each component of an AP 10 in detail with reference to FIG. 2.

As shown in FIG. 2, the AP 10 may include a processor 101 and at least two radio frequency circuits, a listening radio frequency circuit 102 and an extended radio frequency circuit 103. The processor 101, the listening radio frequency circuit 102, and the extended radio frequency circuit 103 may be connected using a bus or may be connected directly.

The processor 101 may control an operating status of the radio frequency circuits. The processor 101 may be a central processing unit (CPU), a network processor (NP), a hardware chip, or any combination thereof. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof. The listening radio frequency circuit 102 and the extended radio frequency circuit 103 are different radio frequency circuits. The radio frequency circuit is also referred to as a radio frequency module, and may be configured to receive and transmit a radio frequency signal. Signals received by the listening radio frequency circuit 102 and the extended radio frequency circuit 103 may be processed by the processor 101.

Each radio frequency circuit of the AP 10 has its own operating frequency band. Optionally, an operating frequency band of the listening radio frequency circuit 102 may be 2.4 GHz, and an operating frequency band of the extended radio frequency circuit 103 may be any WLAN frequency band other than the 2.4 GHz frequency band. The WLAN frequency bands include a 0.9 GHz frequency band, a 2.4 GHz frequency band, a 3.6 GHz frequency band, a 4.9 GHz frequency band, a 5 GHz frequency band, a 5.9 GHz frequency band, a 45 GHz frequency band, a 60 GHz frequency band, and a new operating frequency band that may be introduced in the future. For example, the extended radio frequency circuit 103 may be a radio frequency circuit whose operating frequency band is 5 GHz. The operating frequency band of the extended radio frequency circuit 103 may further be switchable among multiple frequency bands. For example, the extended radio frequency circuit 103 may further be a 2.4 GHz/5 GHz switchable radio frequency circuit. "2.4 GHz/5 GHz switchable" indicates that the radio frequency circuit may be switched to either the 2.4 GHz or 5 GHz frequency band as required during operating.

Further, the processor 101 may be configured to turn off the extended radio frequency circuit in the AP when the AP is not associated with any terminal and there is no to-be-associated terminal within a preset time segment.

Figure 3:
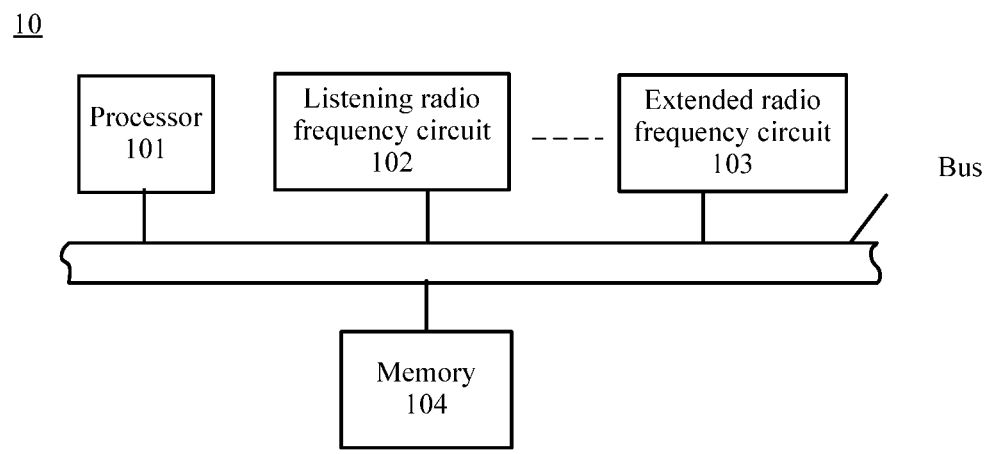
FIG. 3 is a schematic structural diagram of another AP according to an embodiment of the present disclosure.

Further, as shown in FIG. 3, the AP 10 may further include a memory 104 configured to store program code and transmit the program code to the processor 101 such that the processor 101 executes the program code to implement various functions of the AP 10. The memory 104 may be a volatile memory such as a random access memory (RAM), or a non-volatile memory such as a read-only memory (ROM), a flash memory, a hard disk drive (HDD), or a solid state drive (SSD), or a combination of the foregoing types of memories. The processor 101 may run or execute the program code stored in the memory 104, and invoke data stored in the memory 104 to implement various functions of the AP 10.

For ease of description, in the following embodiment, an AP energy saving process provided in the present disclosure is shown and described in detail in a step form. The shown steps may be performed in a group of computer systems that can execute an instruction. In addition, although a logical sequence is shown in the figure, in some cases, the shown or described steps may be performed in a different sequence.

Figure 4A:
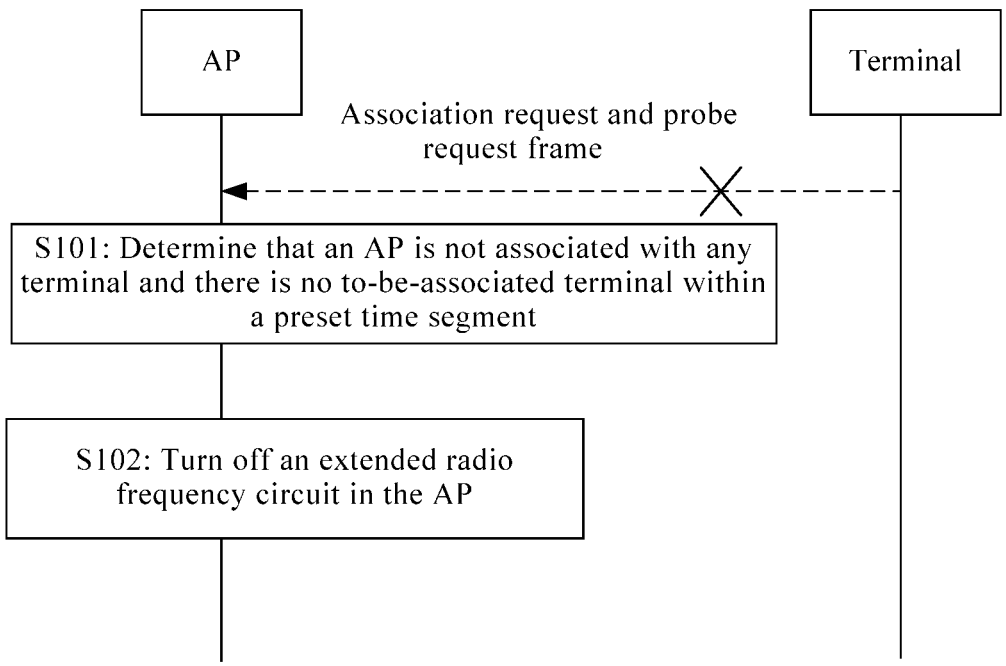
FIG. 4A is a flowchart of an AP energy saving method according to an embodiment of the present disclosure.

FIG. 4A is a flowchart of an AP energy saving method according to an embodiment of the present disclosure, where the method may be executed by the AP 10 shown in FIG. 2. As shown in FIG. 4A, the method may include the following steps.

Step S101: Determine that an AP is not associated with any terminal and there is no to-be-associated terminal within a preset time segment.

The preset time segment may be set as required. Duration of the preset time segment may be fixed, or may be dynamically changed. For example, a value of the preset time segment in the daytime is large, and a value of the preset time segment at night is small. If the AP is not associated with any terminal within the preset time segment, it indicates that the AP does not provide a wireless service for any terminal within the time segment. That there is no to-be-associated terminal within the preset time segment indicates that there is no potential terminal that requires the AP to provide a wireless service.

The terminal may be a mobile phone, a computer, a tablet computer, an electronic book (e-book) reader, a wearable device, or another device providing a WLAN function.

In this embodiment of the present disclosure, a terminal that establishes a wireless connection to the AP may be referred to as a terminal associated with the AP. The AP may determine, according to the following one or more conditions, that a terminal to be associated with the AP exists.

(1) A probe request frame that is sent by the to-be-associated terminal to the AP is received.

(2) An association request that is sent by the to-be-associated terminal to the AP is received. The association request may be an association request frame or a re-association request frame.

(3) A WLAN frame that is sent by the to-be-associated terminal to another AP different from the AP is received. If the WLAN frame that is sent by the terminal to the other AP can be received by the AP, it indicates that the terminal is relatively close to the AP and may soon require the AP to provide a service.

(4) A WLAN controller instructs that the terminal to be associated with the AP exists. For example, a neighbor relationship between multiple APs is maintained in the WLAN controller. If a neighboring AP of the AP is providing a wireless service for the terminal, the WLAN controller determines that the terminal to be associated with the AP exists and instructs the AP not to turn off a radio frequency circuit. The neighbor relationship maintained in the WLAN controller may be statically configured, or may be dynamically updated.

For example, as shown in FIG. 4A, the AP determines, according to the condition (1) and the condition (2), that the terminal to be associated with the AP exists. If the AP does not receive, within the preset time segment, the association request or probe request frame that is sent by the terminal, neither the condition (1) nor the condition (2) is met, and the AP determines that there is no to-be-associated terminal. In addition, if the AP is not associated with any terminal within the preset time segment, the AP turns off an extended radio frequency circuit.

Step S102: Turn off an extended radio frequency circuit in the AP.

There are many available WLAN frequency bands, but nearly all terminals support a 2.4 GHz frequency band. Although terminals supporting 5 GHz and even 60 GHz gradually increase, all these terminals generally support the 2.4 GHz frequency band. Therefore, even if the AP turns off the extended radio frequency circuit, the AP can provide a WLAN service for the terminal provided that a radio frequency circuit at the 2.4 GHz frequency band is turned on.

If a new to-be-associated terminal is discovered after the extended radio frequency circuit is turned off, the AP turns on the extended radio frequency circuit to provide a service that is of another WLAN frequency band and that may be required by the to-be-associated terminal.

In this way, if the AP does not serve any terminal, only the 2.4 GHz frequency band in the AP may be turned on, and a WLAN frequency band other than the 2.4 GHz frequency band may be turned off. When a basic WLAN service is provided, a quantity of operating radio frequency circuits in the AP decreases. Therefore, energy is saved for the AP without affecting the WLAN service.

For example, it is assumed that the AP includes a radio frequency circuit whose operating frequency band is 2.4 GHz and a radio frequency circuit whose operating frequency band is 5 GHz, and both the two radio frequency circuits are in an operating state. After performing steps S101 and S102, the AP turns off the radio frequency circuit whose operating frequency band is 5 GHz, and only the radio frequency circuit whose operating frequency band is 2.4 GHz is turned on.

It is assumed that the AP includes three operating radio frequency circuits, a radio frequency circuit whose operating frequency band is 2.4 GHz, a radio frequency circuit whose operating frequency band is 5 GHz, and a 2.4 GHz/5 GHz switchable radio frequency circuit, where the 2.4 GHz/5 GHz switchable radio frequency circuit is currently operating at the 2.4 GHz frequency band. After steps S101 and S102 are performed, the radio frequency circuit whose operating frequency band is 2.4 GHz may be turned on, and the radio frequency circuit whose operating frequency band is 5 GHz and the 2.4 GHz/5 GHz switchable radio frequency circuit may be turned off. Alternatively, the AP may turn on the 2.4 GHz/5 GHz switchable radio frequency circuit, keep the radio frequency circuit operating at the 2.4 GHz frequency band, and turn off the radio frequency circuit whose operating frequency band is 2.4 GHz and the radio frequency circuit whose operating frequency band is 5 GHz.

When the AP discovers a to-be-associated terminal, the extended radio frequency circuit that is already turned off in the AP is turned on. A condition for discovering the to-be-associated terminal by the AP may be the same as the condition for determining that there is no terminal to be associated with the AP in step 101, or may be looser than the condition in step 101. For example, if the AP determines, according to the condition (1) and the condition (2), that there is no terminal to be associated with the AP in step 101, when either the condition (1) or the condition (2) is met, the AP turns on the extended radio frequency circuit that is already turned off. Optionally, the AP may also add the condition (3), the condition (4), or a combination thereof as a condition for turning on the extended radio frequency circuit that is already turned off. For example, when any one of the condition (1) to the condition (4) is met, the AP turns on the extended radio frequency circuit that is already turned off.

Because the AP keeps turn-on of a listening radio frequency circuit, and nearly all terminals support the 2.4 GHz frequency band, the AP may use the listening radio frequency circuit to discover the to-be-associated terminal (for example, use the listening radio frequency circuit to determine that any one of the condition (1) to the condition (3) is met).

Figure 4B:
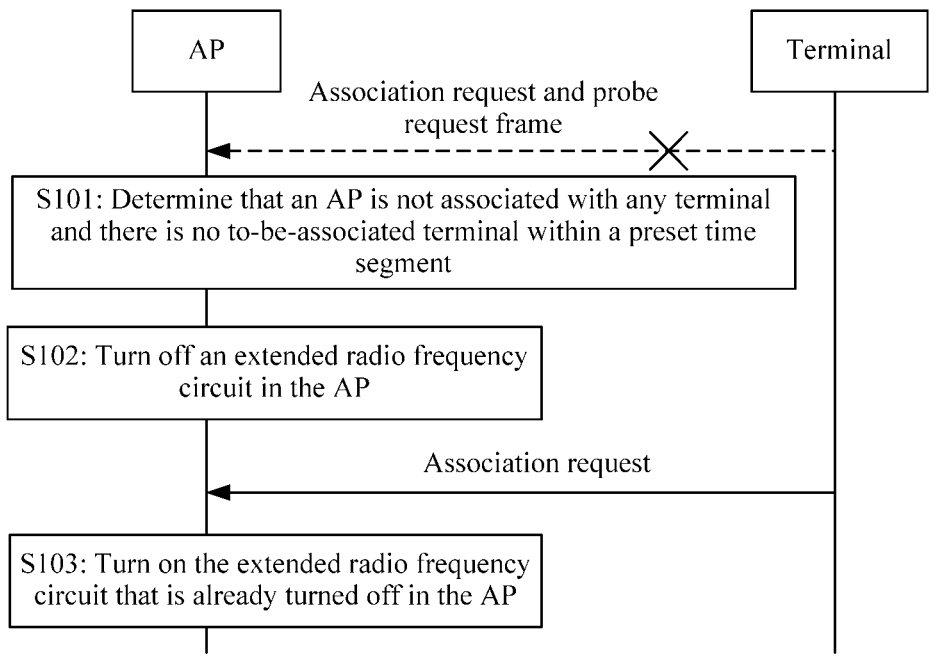
FIG. 4B is a flowchart of an AP energy saving method according to an embodiment of the present disclosure.

For example, as shown in FIG. 4B, when the AP receives, using the listening radio frequency circuit, the association request sent by the terminal, step S103 is performed.

Step S103: The AP turn on the extended radio frequency circuit that is already turned off in the AP.

Optionally, after the extended radio frequency circuit in the AP is turned off in step S102, in order to further improve an energy saving effect of the AP, the AP may further prolong a beacon packet sending period (that is, a beacon interval) to improve the energy saving effect of the AP. Specific implementation is as follows.

After turning off the extended radio frequency circuit in the AP, the AP may increase the beacon interval from first duration to second duration, and change the beacon interval to the first duration when turning on the extended radio frequency circuit.

The second duration may be set as required. This embodiment of the present disclosure poses no limitation thereon. In the present disclosure, the second duration only needs to be set to a time segment greater than the first duration.

In this way, after the extended radio frequency circuit is turned off, in an actual application, the AP may send a beacon packet according to the second duration. This prolongs the beacon packet sending period, reduces a quantity of beacon packet sending times of the AP within a given time segment, decreases power consumption resulted from beacon packet sending by the AP, and further enhances the energy saving effect of the AP.

It may be understood that the foregoing technical solutions implemented in a form of method steps may be stored in a readable storage medium of a computer device (which may be a personal computer, a server, a network device, or the like) in a form of a software functional unit. The software functional unit may include several instructions for instructing a computer device to perform part of the steps of the methods in the embodiments of the present disclosure. The foregoing storage medium includes various mediums that can store program code, such as a Universal Serial Bus (USB) flash drive, a removable hard disk, a ROM, a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the claims.

What is claimed is:

1. An access point (AP) energy saving method implemented by an AP comprising at least two wireless local area network (WLAN) radio frequency circuits, wherein the at least two WLAN radio frequency circuits comprise a listening WLAN radio frequency circuit and an extended WLAN radio frequency circuit, and wherein the AP energy saving method comprises:
    turning on the listening WLAN radio frequency circuit and the extended WLAN radio frequency circuit such that the listening WLAN radio frequency circuit and the extended WLAN radio frequency circuit operate simultaneously, wherein an operating frequency band of the listening WLAN radio frequency circuit is a 2.4 gigahertz (GHz) frequency band, and wherein an operating frequency band of the extended WLAN radio frequency circuit is a switchable WLAN frequency band other than the 2.4 GHz frequency band;
    turning off the extended WLAN radio frequency circuit and maintaining the listening WLAN radio frequency circuit in an on state when the AP is not associated with any terminal and no association request frame or re-association request frame is received from a to-be-associated terminal within a preset time segment; and
    turning on the extended WLAN radio frequency circuit upon the listening WLAN radio frequency circuit discovering a to-be-associated terminal such that the listening WLAN radio frequency circuit and the extended WLAN radio frequency circuit operate simultaneously.

2. The AP energy saving method of claim 1, wherein the AP discovers the to-be-associated terminal using the listening WLAN radio frequency circuit.

3. The AP energy saving method of claim 2, wherein the AP discovers the to-be-associated terminal using the listening WLAN radio frequency circuit by:
    receiving a probe request from the to-be-associated terminal;
    receiving an association request from the to-be-associated terminal;
    receiving a re-association request from the to-be-associated terminal; and
    receiving a notification that a WLAN frame is sent by the to-be-associated terminal from another AP terminal.

4. The AP energy saving method of claim 1, further comprising increasing a beacon interval from a first duration to a second duration after turning off the extended WLAN radio frequency circuit.

5. The AP energy saving method of claim 4, further comprising changing the beacon interval back to the first duration when turning on the extended WLAN radio frequency circuit.

6. The AP energy saving method of claim 1, wherein the listening WLAN radio frequency circuit and the extended WLAN radio frequency circuit are two WLAN radio frequency circuits that are independent of each other.

7. An access point (AP), comprising:
    a processor; and
    at least two wireless local area network (WLAN) radio frequency circuits coupled to the processor, wherein the at least two WLAN radio frequency circuits comprise:
        a listening WLAN radio frequency circuit, wherein an operating frequency band of the listening WLAN radio frequency circuit is a 2.4 gigahertz (GHz) frequency band; and
        an extended WLAN radio frequency circuit, wherein an operating frequency band of the extended WLAN radio frequency circuit is a switchable WLAN frequency band other than the 2.4 GHz frequency band, and wherein the processor is configured to:
    turn on the listening WLAN radio frequency circuit and the extended WLAN radio frequency circuit such that the listening WLAN radio frequency circuit and the extended WLAN radio frequency circuit operate simultaneously;
    turn off the extended WLAN radio frequency circuit and maintain the listening WLAN radio frequency circuit in an on state when the AP is not associated with any terminal and no association request frame or re-association request frame is received from a to-be-associated terminal within a preset time segment; and
    turn on the extended WLAN radio frequency circuit upon the listening WLAN radio frequency circuit discovering a to-be-associated terminal such that the listening WLAN radio frequency circuit and the extended WLAN radio frequency circuit operate simultaneously.

8. The AP of claim 7, wherein the processor is configured to discover the to-be-associated terminal using the listening WLAN radio frequency circuit.

9. The AP of claim 8, wherein the processor discovers the to-be-associated terminal using the listening WLAN radio frequency circuit by:
    receiving a probe request from the to-be-associated terminal;
    receiving an association request from the to-be-associated terminal;
    receiving a re-association request from the to-be-associated terminal; and
    receiving a notification that a WLAN frame is sent by the to-be-associated terminal from another AP terminal.

10. The AP of claim 7, wherein the processor is further configured to increase a beacon interval from a first duration to a second duration after turning off the extended WLAN radio frequency circuit.

11. The AP of claim 10, wherein the processor is further configured to change the beacon interval back to the first duration when turning on the extended WLAN radio frequency circuit.

12. The AP of claim 7, wherein the listening WLAN radio frequency circuit and the extended WLAN radio frequency circuit are two WLAN radio frequency circuits that are independent of each other.

13. A computer program product comprising a non-transitory computer readable storage medium storing program code thereon for access point (AP) energy saving, wherein the AP comprises at least two wireless local area network (WLAN) radio frequency circuits, wherein the at least two WLAN radio frequency circuits comprise a listening WLAN radio frequency circuit and an extended WLAN radio frequency circuit, and wherein the program code comprises instructions to cause the AP to:

on the listening WLAN radio frequency circuit and the extended WLAN radio frequency circuit such that the listening WLAN radio frequency circuit and the extended WLAN radio frequency circuit operate simultaneously, wherein an operating frequency band of the listening WLAN radio frequency circuit is a 2.4 gigahertz (GHz) frequency band, and wherein an operating frequency band of the extended WLAN radio frequency circuit is a switchable WLAN frequency band other than the 2.4 GHz frequency band;

turn off the extended WLAN radio frequency circuit and maintain the listening WLAN radio frequency circuit in an on state when the AP is not providing wireless services to any terminal and no association request frame or re-association request frame is received from a to-be-associated terminal within a preset time segment; and turn on the extended WLAN radio frequency circuit upon the listening WLAN radio frequency circuit discovering a to-be-associated terminal such that the listening WLAN radio frequency circuit and the extended WLAN radio frequency circuit operate simultaneously.

14. The computer program product of claim 13, wherein the program code further comprises instructions to cause the AP to discover the to-be-associated terminal using the listening WLAN radio frequency circuit.

15. The computer program product of claim 14, wherein the program code further comprises instructions to cause the AP to:

receive a probe request from the to-be-associated terminal;

receive an association request from the to-be-associated terminal;

receive a re-association request from the to-be-associated terminal; and receive a notification that a WLAN frame is sent by the to-be-associated terminal from another AP terminal.

16. The computer program product of claim 13, wherein the program code further comprises instructions to cause the AP to:

increase a beacon interval from a first duration to a second duration after turning off the extended WLAN radio frequency circuit; and change the beacon interval back to the first duration when turning on the extended WLAN radio frequency circuit.

17. The computer program product of claim 13, wherein the listening WLAN radio frequency circuit and the extended WLAN radio frequency circuit are two WLAN radio frequency circuits that are independent of each other.

* * * * *

UNITED STATES PATENT AND TRADEMARK OFFICE
CERTIFICATE OF CORRECTION

PATENT NO. : 10,736,031 B2
APPLICATION NO. : 15/670716
DATED : August 4, 2020
INVENTOR(S) : Chen Wang, Lin Zhang and Biao Ji Page 1 of 1

It is certified that error appears in the above-identified patent and that said Letters Patent is hereby corrected as shown below:

In the Claims

Claim 13, Column 9, Line 1: "on the listening WLAN" should read "turn on the listening WLAN"

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*